United States Patent [19]
Kachi

[11] 3,798,793
[45] Mar. 26, 1974

[54] TUTORIAL LEARNING APPARATUS
[75] Inventor: Kenjiro Kachi, Aichi, Japan
[73] Assignee: Elmo Company Limited, Nagoya, Aichi Prefecture, Japan
[22] Filed: Aug. 22, 1972
[21] Appl. No.: 282,692

[30] Foreign Application Priority Data
Aug. 28, 1971 Japan................................ 46-77996

[52] U.S. Cl................................................. 35/9 A
[51] Int. Cl. ............................................ G09b 7/08
[58] Field of Search.............................. 35/9 R, 9 A

[56] References Cited
UNITED STATES PATENTS
| | | | |
|---|---|---|---|
| 3,608,208 | 9/1971 | Willardson............................ | 35/9 A |
| 3,355,818 | 12/1967 | Whitehorn............................ | 35/9 A |
| 3,355,819 | 12/1967 | Hannah et al. ........................ | 35/9 A |
| 3,157,955 | 11/1964 | Pfeiffer................................ | 35/9 R |

*Primary Examiner*—Wm. H. Grieb
*Attorney, Agent, or Firm*—Wenderoth, Lind & Ponack

[57] ABSTRACT
A tutorial learning apparatus employs a positive or negative web film on which programmed images of a course material(s) are formed and which can be driven by a motor so that a selected one of the programmed images is brought into a projection position thereof. For each image, at least two kinds of marks are recorded on the film respectively, one of which provides a signal to indicate a transit of the corresponding image through the projection position thereof, the other of which provides a signal to indicate one image which is to be projected next, that is, to indicate the number of images to be fed forwardly or backwardly through the projection position. If necessary, each image may be provided with a mark which provides a signal to indicate the direction in which the motor is to be rotated.

When the film is being fed in a given direction, one signal to indicate the transit of each image through the projection position is generated every time an image passes over the projection position. Such image transit indicating signal is applied to a comparison circuit wherein the number of the image transit indicating signals is compared with the number of images to be fed, and which generates an output signal to cause a stoppage of rotation of the motor when the number of the image transit indicating signals reaches the number of images to be fed.

3 Claims, 6 Drawing Figures

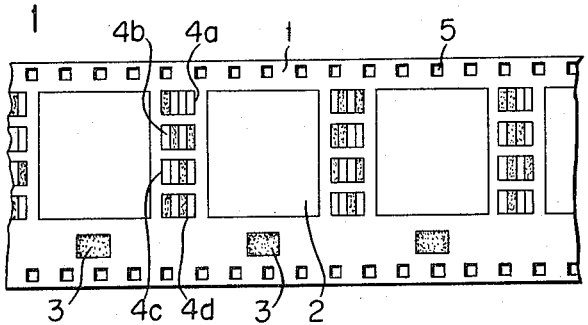
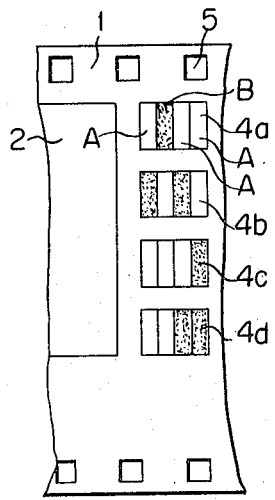
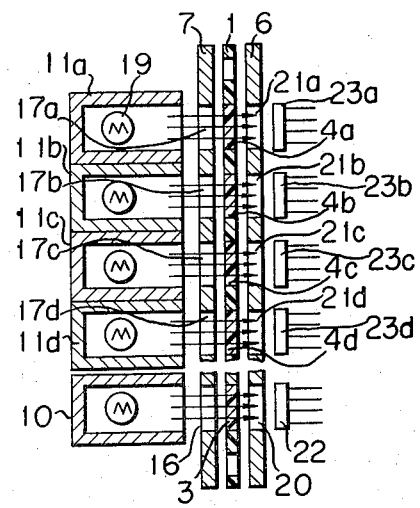
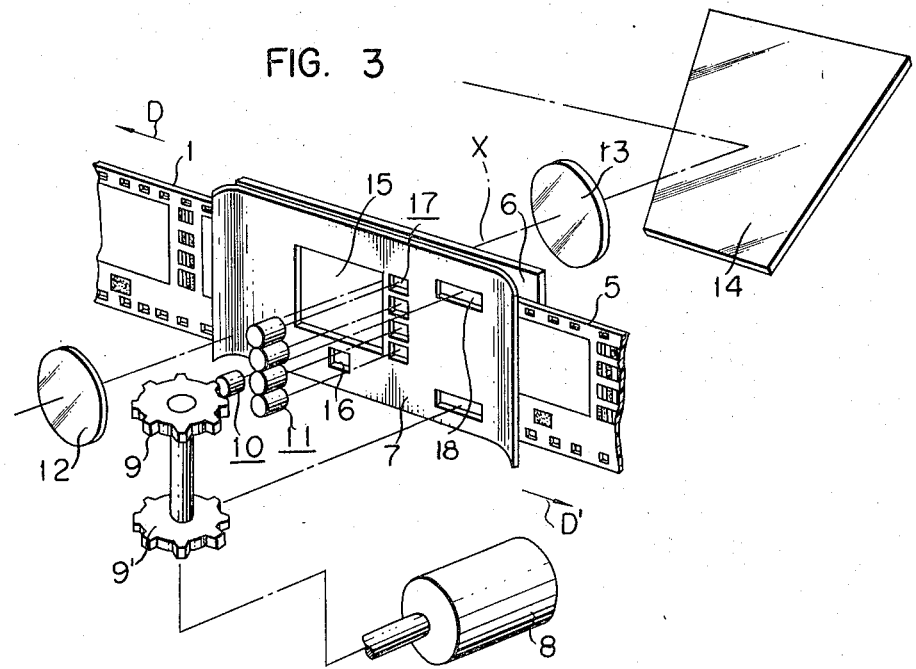

TUTORIAL LEARNING APPARATUS

BACKGROUND OF THE INVENTION

This invention relates to a tutorial learning apparatus utilizing a web film.

Recently, as an aid in education, tutorial learning devices including a screen onto which a course material broken down into programmed small pieces of information is projected to be viewed by an individual student have been employed in many schools, etc. Although two types of the tutorial learning apparatus have been provided, one of which utilizes a VTR system and the other of which utilizes a motion picture apparatus such as a projector, the latter type learning apparatus is mainly employed because the former type learning apparatus necessarily uses an expensive magnetic tape and is of a complicated and bulky construction.

In addition, with the learning apparatus utilizing a web film, the most frequently adopted method of programming of course material has been the relatively simpler linear type in which the small pieces of information recorded on the film to be presented to the student follow in a straight uninterrupted sequence so that the student can progress in learning the course material therealong.

In such learning apparatus, in order to learn the course material programmed in the method of a feedback type wherein the student is sent forward or backward depending on whether he has chosen the correct answer or the wrong answer from a binary choice of answers, and to learn the course material programmed in the method of a branching type which provides a far wider selection of answers from which the student can made his choice, it has been necessary to combine a computer with the learning apparatus. This results in great expense and thus a limited application of the learning apparatus.

SUMMARY OF THE INVENTION

It is therefore an object of the invention to provide a tutorial learning apparatus in which any type of program, for example, even the feedback program and the branching program, can be used without the need of a computer.

In accordance with the invention, a tutorial learning apparatus comprises a web film on which programmed images of a course material(s) are formed and which is adapted to be driven by a motor so that the indicated one of the programmed images is brought into a projection position thereof. For each image, one image counter code, which is optically detected and counted when the film is moving to thereby count up the number of images which have passed the projection position, and a plurality of instruction codes, each of which indicates the next image to be projected after the projection of the associated image, are preliminarily recorded on the film in positions out of the film image area. The tutorial learning apparatus further comprises a switching means consisting of a plurality of answer switches corresponding to the plurality of instruction codes.

In case the program is made for example in question and answer form, each image involves a question to which a binary or multiple choice of answers is provided. When an individual student selects one of the answers in response to the question and actuates the answer switch corresponding to the selected answer, only the instruction code corresponding to the selected answer switch is illustrated by an illumination means, whereby a signal for indicating the next image to be projected, that is, indicating the number of images to be fed through the projection position, is generated and fed through a comparison circuit to a motor controlling circuit, allowing the rotation of the motor to feed the film in the given direction. When the film is moving as above described, each image counter code generates a light signal every time the associated image passes the projection position thereof, and the generated light signal(s) is counted by a counter circuit and fed to the aforesaid comparison circuit. The number counted up by the counter circuit represents the number of the images which have passed the projection position. In the comparison circuit, the number counted up by the counter circuit is compared with the aforesaid signal for indicating the number of the images to be fed. When the former number reaches the latter, the comparison circuit generates a signal commanding the motor to stop, whereby the next image to be projected just stops at the projection position thereof.

The image counter code consists of a light permeable or impermeable mark. If the film utilized is negative, the mark is light impermeable and, if positive, light permeable, so that each image counter code can generate a light signal every time each image counter code passes across a beam of light originating from an illumination means.

Each of the instruction codes comprises a plurality of code elements each of which also consists of a light permeable or impermeable mark. It is assumed that the number of the code elements is three and the light permeable and impermeable code elements generate "1" and "0" digital signals respectively. Then, by changing a combination of the light permeable and impermeable code elements, any numeral of one to seven can be indicated by one instruction code. The film is fed by an amount proportional to the number of the images which is identical with the numeral indicated by the instruction code.

One of the plurality of the code elements of the instruction code may be utilized to indicate a direction in which the film is to be fed. The film feeding direction can be decided in such a manner that if the code element is light permeable the film is fed forwardly and, if imperable, backwardly.

BRIEF DESCRIPTION OF THE DRAWINGS

Further objects and advantages of the invention will become more readily apparent from the following detailed description taken in conjunction with the accompanying drawings in which:

FIG. 1 is a fragmental plan view of a web film utilized in a tutorial learning apparatus of the invention;

FIG. 2 shows a part of FIG. 2, on an enlarged scale, especially showing an arrangement of instruction codes:

FIG. 3 is a perspective view of the essential parts of the tutorial learning apparatus;

FIG. 4 is a detailed sectional view of illumination means and light detection means utilized in the tutorial learning apparatus;

DESCRIPTION OF THE PREFERRED EMBODIMENT

Figure 5:
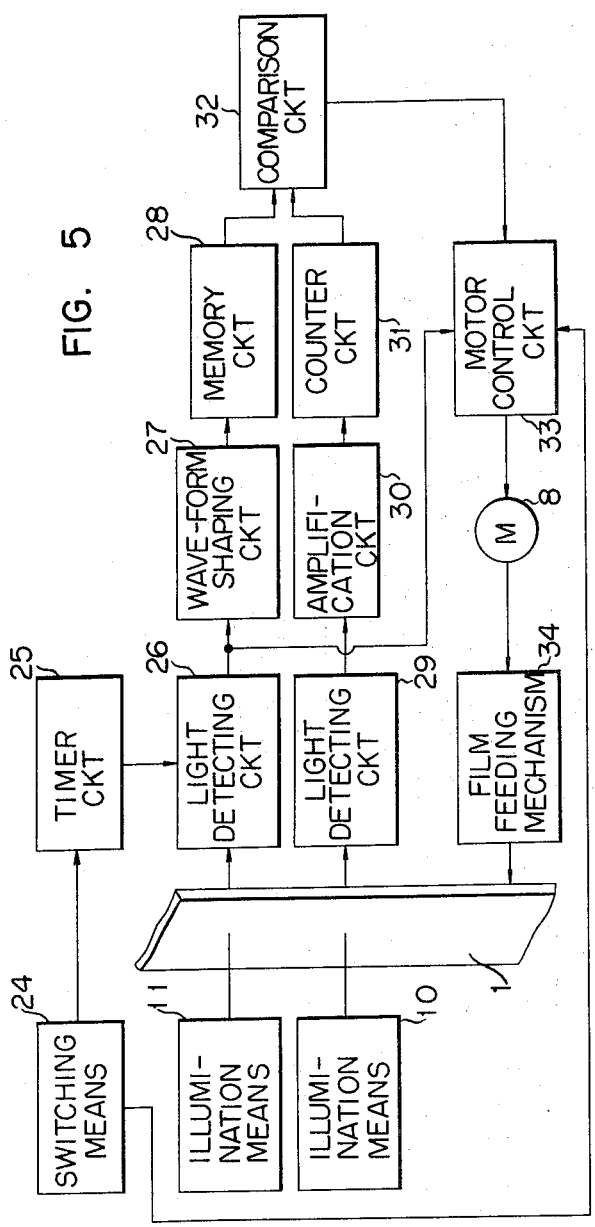
FIG. 5 is a block diagram illustrating the entire construction of the invention.

Referring to FIG. 1, there is shown a part of a web film 1, which may be generally a 16 mm or 35 mm width of motion picture film. On the film 1, programmed images 2 of a course material(s) to be projected onto a screen 36 (see FIG. 6) to be viewed by a student are formed with a spacing between the adjacent images 2, and an image counter code 3 for indicating transit of the associated image 2 through a projection position thereof is recorded for each image. Furthermore, for each image, a plurality of instruction codes — in the embodiment, four codes 4a, 4b, 4c and 4d — are also recorded on the spacing between the adjacent images to indicate the next image to be projected to which the film is to be stepped back or forward. It is noted that the image counter code 3 and the instruction codes 4a, 4b, 4c and 4d are arranged by way of example in the positions shown in FIG. 1, but may be recorded in any suitable positions out of the areas of the images 2 and perforations 5 provided in the film 1 for film feeding.

FIG. 2 shows an arrangement of the instruction codes 4a, 4b, 4c and 4d in detail, each instruction code being divided into four code elements. The number of the instruction codes and the number of divided code elements can be changed as desired. For example, where a program is made in question and answer form and the number of the instruction codes are four as shown in the embodiment, the student is allowed to select one answer, which he thinks to be correct, from four alternative answers. The film is stepped in response to the selected answer. Of the divided code elements of each instruction code, the element indicated by a letter A is light permeable and the element indicated by a letter B is light impermeable for a purpose as hereinafter described. Furthermore, of these divided code elements, the righthand three elements are for indicating the next image to be projected and the remainder or lefthand element is for indicating the direction in which the film 1 is to be fed. In addition, the image counter code 3 is not light permeable in the illustrated embodiment.

It will be noted however that the image counter code 3 may be light permeable if the film utilized is negative.

In FIG. 3, the film 1 is adapted to pass through a film gate formed by an aperture plate 6 and a pressure plate 7. The feeding of the film 1 is effected in a conventional manner through toothed sprockets 9 and 9' engageable with the successive perforations 5 provided in the film 1 and driven through a power transmission member(s) (not shown) by a driving motor 8. The sprocket, the power transmission member(s), etc. form a film feeding mechanism. The image 2 on the film 1 just positioned at an aperture mask 15 provided in the film gate is projected through a projection lens 13 and a reflecting mirror 14 onto the screen 36 (shown in FIG. 6) by a beam of light X emanating from a not shown projection lamp. The student can view a display projected onto the screen 36. 12 is a condensing lens for condensing the light beam X from the projection lamp. The pressure plate 7 may be formed with openings 18 through which the sprockets 9 and 9' engage the perforations 5 of the film 1.

On the projection lamp side of the film 1, there are mounted illumination means 10, and 11a, 11b, 11c and 11d so arranged as to illuminate respectively, through light openings 16, and 17a, 17b, 17c and 17d provided in the pressure plate 7, the aforesaid image counter code 3 and the instruction codes 4a, 4b, 4c and 4d attached to the image rested in the projection position. Each of the illumination means may employ as a light source a luminous body such, for example, as a miniature lamp, a luminous diode and the like.

FIG. 4 shows the aforementioned illumination means 10, and 11a, 11b, 11c and 11d in detail. On the one hand, a light emanating from the light source 19 of the illumination means 10 impinges through the opening 16 provided in the pressure plate 7 upon a part of the film 1 and passes, if the said part of the film 1 is not in the area of the image counter code 3, through the film 1 and an opening 20 provided in the aperture plate 6 to a photoelectric element 22. If the said part of the film 1 is in the area of the image counter code 3, the light is shielded by the image counter code as the latter is light impermeable. Thus, the pass of the image counter code 3 across the light beam from the illumination means 10 can be found by detecting an absence of the light from the photoelectric element 22. On the other hand, lights from the light sources 19 of the illumination means 11a, 11b, 11c and 11d impinge respectively through the openings 17a, 17b, 17c and 17d upon the corresponding instruction codes 4a, 4b, 4c and 4d and thereafter pass, if the lights are impinged upon the light permeable code elements of the instruction codes, through openings 21a, 21b, 21c and 21d to corresponding photoelectric elements 23a, 23b, 23c and 23d. It will be understood that one photoelectric element and one illumination means are provided for one instruction code corresponding to the image 2 rested at the position of the aperture mask 15.

The entire construction of the invention is illustrated in a block diagram of FIG. 5, wherein 24 is a switching means consisting of answer switches 24a, 24b, 24c and 24d; 25 a timer circuit; 26 a light detecting circuit; 27 a wave-form shaping circuit; 28 a memory circuit; 29 a light detecting circuit; 30 an amplification circuit; 31 a counter circuit; 32 a comparison circuit; 33 a motor controlling circuit; and 34 a film feeding mechanism.

Figure 6:
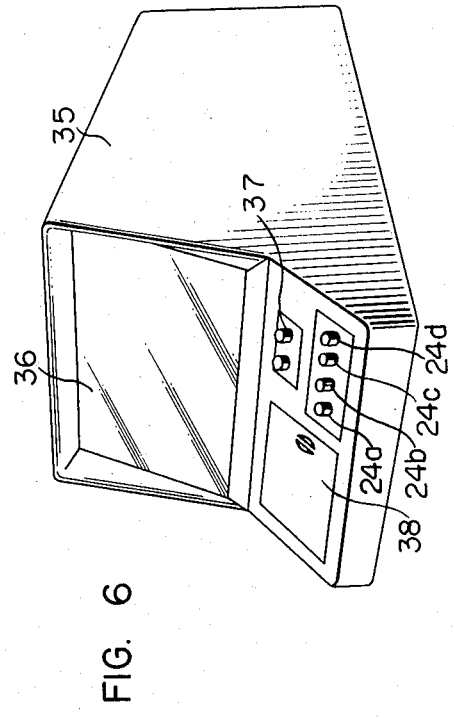
FIG. 6 is a perspective outline of the tutorial learning apparatus of the invention.

In FIG. 6, an outline of the tutorial learning apparatus is shown, wherein 35 is a housing containing the aforementioned members; 37 manually operated switches; and 38 a lid through which an exchange of programmed films can be carried out. The film 1 is adapted to be fed frame by frame in either forward or backward direction D or D'(FIG. 3) by actuating either of the two manually operated switches 37. The switching means 24 consists of the four answer switches 24a, 24b, 24c and 24d corresponding respectively to the illumination means 11a, 11b, 11c and 11d. The student or problem solver can select and actuate one of the answer switches 24a, 24b, 24c and 24d in response to a question displayed on the screen 36 by projecting the question bearing image.

The operation of the tutorial learning apparatus will now be described in conjunction with the drawings, particularly the block diagram of FIG. 5.

Before describing the operation, it is stated again that the film 1 carries the successive images preliminarily recorded in any type of programming method so that the student can learn the prescribed course of study, and the film also carries for each image the image counter code 3 for indicating the transit of the corresponding image 2 through the projection position thereof, and the instruction codes 4a, 4b, 4c and 4d. Where the program is made in question and answer form, the student selects one of the answers projected on the screen 36 and actuates the answer switch corresponding to the selected answer, whereby the instruction code corresponding to the student operated answer switch indicates the next image to be projected. One of the four code elements of each instruction code is to command the motor 8 to feed the film 1 in either the forward or backward direction.

At the beginning, the initial image on the film 1 carried between the pressure plate 7 and the aperture plate 6 is projected onto the screen 36 by the projection lamp. In response to the projected question on the screen 36, the student selects one answer, which he thinks to be correct, and actuates one of the answer switches, for example, the answer switch 24a corresponding to the selected answer, where upon only the corresponding illumination means 11a is actuated, thus, allowing the instruction code 4a corresponding to the illumination means 11a to generate digital signals which are detected, as hereinafter described, by the light detecting circuit 26. In the meantime, upon actuation of the selected answer switch 24a, a starting signal is applied to the motor controlling circuit 33 while at the same time the timer circuit 25 is activated. The timer circuit 25 is adapted, if any one of the answer switches 24a, 24b, 24c and 24d is once actuated, to have the digital signals of the corresponding instruction code 4a continued until the next image to be projected indicated by the above digital signals comes in the projection position thereof. Therefore, even if the student pushes down another answer switch 24b, 24c or 24d erroneously during the film feeding, this does not affect the operation of the tutorial learning apparatus. The timer circuit 25 is connected to the light detecting circuit 26 comprising the photoelectric elements 23a, 23b, 23c and 23d (FIG. 4). A part of the light from the activated illumination means 11a permeates the light permeable area of the corresponding instruction code 4a and is received by the corresponding photoelectric element 23a while the other part of the light from the activated illumination means 11a is shielded by the impermeable area of the instruction code 4a. It is assumed that the light permeable and impermeable code elements A and B generate respectively "1" and "0" digital signals and the "1" signal generated by the most lefthand code element indicates that the film 1 is to be fed forwardly, a combination of light signals obtained by actuating the answer switch 24a can be expressed by "1011" in digital form which means that the film is to be fed in the forward direction by an amount proportional to the number of images equalling 3 ($=0 + 2^1 + 2^0$). Then, an output light signal of the photoelectric element 23a is applied to the wave-form shaping circuit 27, wherein the output light signal is converted in the form of a rectangular pulse(s) which is favorable for the transmission and the control of the output light signal. Such a rectangular pulse signal is then fed to and memorized in the memory circuit 28 comprising a flip-flop circuit.

With respect to the motor controlling circuit 33, the aforesaid signal for starting the motor 8 and a rotational direction indicating signal from the photoelectric element 23a of the light detecting circuit 26 indicating the direction in which the film is to be driven are applied thereto simultaneously with the actuation of the selected answer switch 24a, so that the motor 8 can rotate in the indicated direction, the film 1 being fed accordingly through the film feeding mechanism 34 including the sprocket 9 shown in FIG. 3. When the film 1 is being thusly fed, each light impermeable mark of the image counter code 3 is illuminated by the light from the illumination means 10 every time it moves thereacross and therefore the transit of each image through the projection position thereof is detected by the photoelectric element 22(FIG. 4) of the light detecting circuit 29. An output of the light detecting circuit 29 is applied to the counter circuit 31 after having been amplified by the amplification circuit 30. The counter circuit 31 may consist of an adder circuit adapted to successively add signal pulses each of which is generated every time each image counter code 3 on the film 1 moves across the light beam from the illumination means 10. The number of the added signal pulses is compared in the comparison circuit 32 with the number of the aforesaid rectangular pulse signals memorized in the memory circuit 28. As a result, where the number of the added signal pulses becomes equivalent to the number of the rectangular pulse signals, a signal to stop the rotation of the motor 8 is adapted to be applied to the motor controlling circuit 33 to thereby cause the film 1 to stop so that the next image indicated by the instruction code 4a is located at the projection position.

In the illustrated embodiment, each instruction code is divided into the four code elements and one of the four code elements is utilized to indicate the direction of rotation of the motor 8, so that the three remaining code elements can represent seven pieces of information in binary form, that is, it is possible to advance and reverse the film by a maximum amount proportional to seven images. It is apparent that, if the number of code elements forming the instruction code is increased to more than three, the number of images indicated by the instruction code can be accordingly increased.

While the invention has been illustrated and described with reference to a single preferred embodiment thereof, it is to be understood that various changes in the details of constructions and the arrangement and combination of parts may be made without departing from the spirit and scope of the invention. For example, a heretofore known subtraction circuit may be employed as the comparison circuit 32 of FIG. 5. In such subtraction circuit, the number of pulse signals generated every time each image counter code moves across the light beam from the illumination means 10 is adapted to be subtracted from the indicated number of images memorized in the memory circuit 28 and, when the difference therebetween becomes null, an output signal to cause the motor to stop is generated. In this case, the adder circuit 31 can be omitted.

What I claim is:

1. A tutorial learning apparatus, comprising:
a screen;
a web film on which a series of images to be projected onto said screen to be viewed by an individual student are formed;
means for feeding said film frame by frame so that each image is brought into a projection position such that a projection of said each image may be effected;

said film being provided, with an image counter code for each image for indicating a transit of said each image through the projection position thereof, and a plurality of instruction codes for indicating a next image to be projected after projection of said each image in the projection position thereof;

means for providing a beam of light to illuminate said image counter code associated with said each image in the projection position to allow said image counter code to generate a light signal showing the transit of said each image through the projection position;

photoelectric means for receiving the light signal from said image counter code and generating as an output thereof a light pulse signal every time said photelectric means receives said light signal;

a plurality of means for providing a plurality of beams of light to illuminate the plurality of said instruction codes associated with said each image in the projection position to allow a selected one of said instruction codes to generate a light signal showing the next image to be projected after the projection of said each image in the projection position;

switching means comprising a plurality of switches capable of being selectively activated to cause the plurality of illuminating means for the plurality of said instruction codes associated with said each image to be illuminated, each of said switches also causing said illumination means for said image counter code attached to said each image to be activated;

a plurality of photoelectric means for receiving the light signals from the plurality of said instruction codes and generating as outputs thereof light pulse signals in response to the received light signals, one of said switches and said illumination means and photoelectric means for said instruction codes being provided for each of said instruction codes on each image in the projection position so that only the selected one of said instruction codes is illuminated upon actuation of the selected one of said switches;

means for memorizing the outputs of the plurality of said photoelectric means for said instruction codes;

a counter circuit provided separately of said memorizing means for counting the number of said light pulse signals generated by said photoelectric means for said image counter codes;

a comparison circuit for comparing an output of said counter circuit with an output of said memorizing means and generating an output signal when both the outputs become equal;

a film feeding means controlling circuit receiving the output signal of said comparison circuit and generating a signal to stop said film feeding means and a signal to start said film feeding means when one of said switches is actuated; and a timer circuit so connected with said switching means and said photoelectric means for said instruction codes as to act simultaneously with the actuation of the selected one of said switches to maintain only the illumination means for the selected one of said instruction codes in an activated condition until the next image to be projected comes in the projection position thereof.

2. The tutorial learning apparatus of claim 1 comprising:

means connected between said photoelectric means for said plurality of instruction codes and said memorizing means for shaping the outputs of said photoelectric means for said instruction codes into the form of a rectangular pulse.

3. A tutorial learning apparatus, comprising in combination:

a screen;

a web film on which a series of images to be projected onto said screen to be viewed by an individual student are formed;

means for feeding said film frame by frame so that each image is brought into a projection position such that a projection of each said image may be effected;

said film being provided with an image counter code for each image for indicating a transit of said each image through the projection position thereof, and a plurality of instruction codes for indicating a next image to be projected after projection of said each image located in the projection position thereof;

means for providing a beam of light to illuminate said image counter code associated with said each image in the projection position to allow said image counter code to generate a light signal showing the transit of said each image through the projection position;

photoelectric means for receiving the light signal from said image counter code and generating as an output thereof a light pulse signal every time said photoelectric means receives said light signal;

a plurality of means for providing a plurality of beams of light to illuminate the plurality of said instruction codes associated with said each image in the projection position to allow a selected one of said instruction codes to generate a light signal showing the next image to be projected after the projection of said each image in the projection position;

switching means comprising a plurality of switches capable of being selectively activated to cause the plurality of illuminating means for the plurality of said instruction codes associated with said each image to be activated, each of said switches also causing said illumination means for said image counter code attached to said each image to be activated;

a plurality of photoelectric means for receiving the light signals from the plurality of said instruction codes and generating as outputs thereof light pulse signals in response to the received light signals, one of said switches, said illumination means and photoelectric means for said instruction codes being provided for each of said instruction codes on each image in the projection position so that only the selected one of said instruction codes is illuminated upon actuation of the selected one of said switches;

means for memorizing the outputs of the plurality of said photoelectric means for said instruction code;

a subtraction circuit connected with said memorizing means and said photoelectric means for said image counter code so that, in said subtraction circuit, the number of pulse signals generated every time each image counter code moves across the light beam from said illumunation means for said image code is subtracted from a predetermined number of images memorized in said memorizing means and, when the difference therebetween becomes zero, generating an output signal to cause the film feeding to stop;
a film feeding means controlling circuit receiving the output signal of said subtraction circuit and generating a signal to stop said film feeding means and a signal to start said film feeding means when one of said switches is actuated; and
a timer circuit so connected with said switching means and said photoelectric means for said instruction codes as to act simultaneously with the actuation of the selected one of said switches to maintain only the illumination means for the selected one of said instruction codes in an activated condition until the next image to be projected comes in the projection position thereof.

* * * * *